Feb. 4, 1930. A. I. MARCUM 1,745,433
SPRING SUSPENSION
Filed July 27, 1926
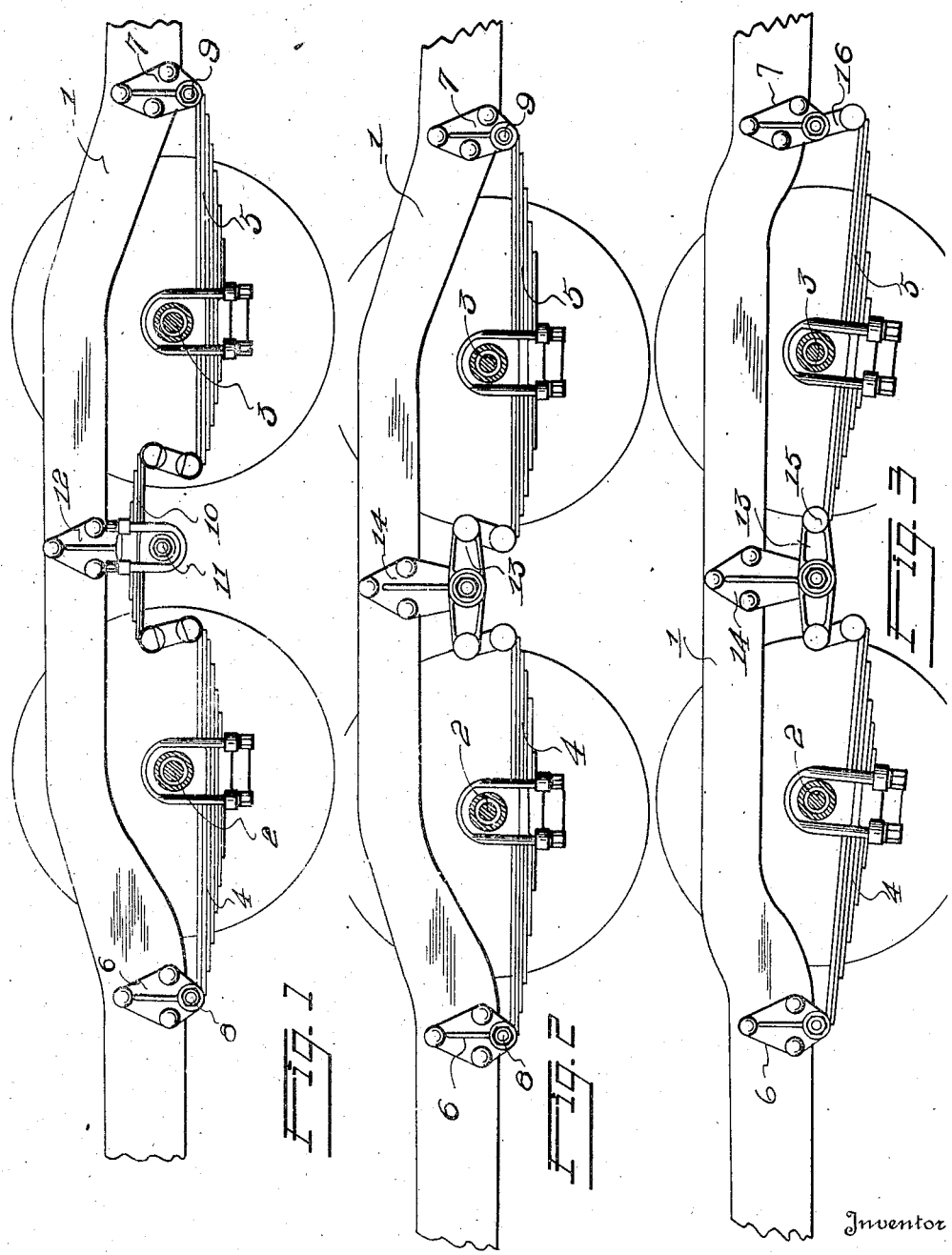
Inventor
Arthur I. Marcum
William A. Strauch
By
Attorney Patented Feb. 4, 1930

1,745,433

UNITED STATES PATENT OFFICE

ARTHUR I. MARCUM, OF OAKLAND, CALIFORNIA, ASSIGNOR TO EMORY WINSHIP, OF MACON, GEORGIA

SPRING SUSPENSION

Application filed July 27, 1926. Serial No. 125,202.

This invention relates to spring suspensions for road vehicles that embody two parallel axles supporting one or both ends of the frame of the vehicle. This application is a continuation in part of application Serial No. 54,560, filed September 4, 1925.

It is an object of the invention to produce spring suspensions that are connected to the frame at three points, and in which the load is distributed equally between the axles.

It is a further object of the invention to produce springs suspensions connected to the frame at three points but in which shocks inflicted on one axle are transmitted to the other axle rather than to the frame.

It is a still further object of the invention to provide spring suspensions for tandem axles including springs individual to each axle and a third spring or lever between said springs to equalize the load on the axles and to transmit the shocks to a spring individual to one axle to the spring that is individual to the other.

A still further object of the invention is to provide a three point spring suspension in which the springs individual to the axles are interchangeable.

A still further object of the invention is to provide a spring suspension of the three point type in which the points of connection between the springs, axles, and frame are substantially in the same horizontal line under normal conditions and in which the spring leaves are horizontally disposed under the same conditions to the end that fore and aft movement of the frame may be reduced to a minimum.

Further objects of the invention will appear as the description of the invention proceeds with reference to the accompanying drawing, in which, Figure 1 is an elevation of one form of my improved suspension.

Figure 2 is a similar view of a modified form thereof.

Figure 3 is a similar view of a further modification, in which the springs are interchangeable.

Like reference characters indicate like parts throughout the several figures.

1 indicates the frame of the vehicle, supported at one end by axles 2 and 3. Said axles have springs 4 and 5 clipped thereto to fixedly secure said springs to said axles. In this respect the structures shown in the several figures are identical.

In Figures 1 and 2, springs 4 and 5 are pivotally attached to frame 1 by brackets 6 and 7 and pivot pins 8 and 9 respectively. As shown in these figures the springs individual to the several axles extend toward each other. In Figure 1 they are shackled to an intermediate spring 10 which is mounted to swing about a pivot pin 11 carried by a bracket 12 secured to the frame 1. As shown on the drawing, the springs preferably extend horizontally under normal load conditions and the points of connection 8, 9 and 11 between the frame and spring suspension are substantially in alignment with the axes of the axles 2 and 3.

The construction just described is intended for passenger carrying vehicles, in particular. In vehicles not intended for this purpose, a rigid lever 13 may be substituted for spring 10 as shown in Figure 2. This lever is pivotally attached to a bracket 14 secured to the frame.

In the modification shown in Figure 3, spring 4 is pivoted to a bracket 6 on frame 1 by a pin 8 as in the other figures. The opposite end of the spring is shackled to one end of lever 13 as in the modification shown in Figure 2. The opposite end of said lever, however, is pivoted directly to spring 5 as shown at 15. Spring 5 is secured to the frame at its other end by a shackle 16 secured to bracket 7. In the modification just described the springs are interchangeable and the axles, unlike those in Figures 1 and 2 swing on arcs that are parallel, thus reducing the spline shaft travel to a minimum.

In operation, when axle 2, for example, is subjected to a shock that causes the axle to rise, part of the blow will be absorbed by spring 4 causing its deflection. The remainder of the blow will be transmitted to the end of intermediate spring 10 or lever 13, causing swinging movement of said spring or lever about its trunnion. Such movement is resiliently resisted by spring 10 itself, when such spring is used, and the unabsorbed force of the blow is transmitted to spring 5 that is individual to axle 3. If axle 3 is subjected to a shock the operation is identical but in a reverse direction.

Inasmuch as the axes of the axles and the axes of the pivotal pins 8, 9 and 11 lie substantially in the same plane, a construction is provided that causes no substantial fore and aft movement of the frame, while permitting the free relative movement between the axles and frame that is essential if the road shocks are not to be transmitted from each axle through the springs to the frame as in some constructions heretofore proposed.

The invention has been above described in detail, but it should be understood that the invention is not confined to such details. The scope thereof is to be determined from the following claims.

What I claim is:

1. A road vehicle including a frame, tandem axles supporting one end of said frame, springs individual to each axle, said springs being pivotally connected to said frame so that the axles swing in substantially vertical arcs, and equalizing means between said springs and pivotally mounted on the frame substantially midway between said axles for transmitting a portion of the road shock from one axle and its springs to the other axle and its springs, each of the springs individual to one of said axles having one end directly connected to said frame and being shackled to said pivoted means.

2. A road vehicle including a frame, tandem axles supporting one end of said frame, springs individual to each axle, said springs being pivotally attached to said frame so that the axles swing in substantially vertical arcs, and pivoted means between said springs for transmitting a portion of the road shock from one axle and its spring to the other axle and its spring, the springs individual to one of said axles being directly connected to said pivoted means and shackled to said frame.

3. A road vehicle including a frame, a pair of axles arranged adjacent one end of said frame, a pair of springs at each side of the frame, said springs being secured to said axles between the spring ends, means to pivotally secure one of said springs to said frame, a relatively short lever pivoted between its ends to said frame, one end of said lever being shackled to the other end of the last named spring, the other end of said lever being pivotally attached to one end of the other of said springs and means to shackle the free end of said last named spring to the frame.

4. A road vehicle comprising a frame, tandem axles arranged adjacent one end of said frame, a spring for each axle adjacent each side of said frame, a relatively short lever pivoted to said frame between its ends and arranged between the ends of the springs on the same side of the vehicle, each of said springs being secured to an axle between its ends, one of said springs being pivoted to said frame at one end and shackled to one end of said lever at its other end, the other of said springs being pivoted at one end to the other end of said lever and being shackled to the frame at its other end.

In testimony whereof I affix my signature.

ARTHUR I. MARCUM.